United States Patent
Kolchin (10) Patent No.: US 9,082,099 B1
(45) Date of Patent: Jul. 14, 2015

(54) SYSTEM AND METHOD FOR CONTEXT-SENSITIVE DELIVERY NOTIFICATION

(71) Applicant: Dmitriy Kolchin, Orange, CA (US)

(72) Inventor: Dmitriy Kolchin, Orange, CA (US)

( * ) Notice: Subject to any disclaimer, the term of this patent is extended or adjusted under 35 U.S.C. 154(b) by 0 days.

(21) Appl. No.: 14/334,780

(22) Filed: Jul. 18, 2014

(51) Int. Cl.
*G06Q 30/00* (2012.01)
*G06Q 10/08* (2012.01)

(52) U.S. Cl.
CPC ........ *G06Q 10/083* (2013.01); *G06Q 10/08355* (2013.01)

(58) Field of Classification Search
CPC ............ G06Q 10/083; G06Q 10/0833; G06Q 10/0835; G06Q 10/08355
USPC ........................................................ 705/335
See application file for complete search history.

(56) References Cited

U.S. PATENT DOCUMENTS

| | | | |
|---|---|---|---|
| 6,483,433 B2 | 11/2002 | Moskowitz et al. | |
| 6,701,217 B1 * | 3/2004 | Sansone ........................ | 700/227 |
| 8,299,923 B2 | 10/2012 | Hammoud | |
| 8,655,795 B1 | 2/2014 | Kolchin | |
| 2002/0024438 A1 | 2/2002 | Roberson | |
| 2002/0103868 A1 | 8/2002 | Khan | |
| 2003/0052778 A1 | 3/2003 | Wong | |
| 2003/0195699 A1 | 10/2003 | Jones | |
| 2003/0231112 A1 | 12/2003 | Raju | |
| 2006/0095348 A1 | 5/2006 | Jones et al. | |
| 2006/0229895 A1 * | 10/2006 | Kodger ............................ | 705/1 |
| 2011/0109165 A1 * | 5/2011 | Hahn et al. ...................... | 307/72 |
| 2011/0307361 A1 * | 12/2011 | Parameswaran et al. ....... | 705/34 |
| 2014/0330603 A1 * | 11/2014 | Corder et al. ................. | 705/7.12 |

FOREIGN PATENT DOCUMENTS

| | | |
|---|---|---|
| WO | 2012055417 A1 | 5/2012 |
| WO | 2013169114 A1 | 11/2013 |

* cited by examiner

*Primary Examiner* — Allen J Jung
(74) *Attorney, Agent, or Firm* — Law Office of Ilya Libenzon (57) ABSTRACT

A method for context-sensitive delivery involves determining, by a computing device, an anticipated delivery time, receiving, by the computing device, from a first delivery-sensing depository, an indication that the first delivery-sensing depository has received a delivery at a time differing from the anticipated delivery time, and alerting, by the computing device, a user regarding the detected delivery.

16 Claims, 5 Drawing Sheets

SYSTEM AND METHOD FOR CONTEXT-SENSITIVE DELIVERY NOTIFICATION

TECHNICAL FIELD

Embodiments disclosed herein relate generally to location-based communication and data gathering, and specifically to the use of mailbox-mounted devices as a basis for communication and data gathering.

BACKGROUND ART

While electronic communication has radically changed the way information can be exchanged, it has not eliminated the need for the physical delivery of parcels. Physical goods, of course, cannot be sent as digital information, and must still be delivered in a more or less conventional manner. Some formal documents must also be delivered rather than sent electronically. Electronic communication has been used to help make the delivery process simpler for the user by means of parcel tracking applications, and some mailboxes can alert the user to the receipt of delivered goods. However, these devices still do not account adequately for the particular circumstances of the user, such as the user's location at the time of the delivery, or special concerns that the user may have regarding a particular delivery or at a particular time.

There is thus a need for a system that alerts users to the delivery of parcels in a context-sensitive manner.

SUMMARY OF THE EMBODIMENTS

A method is disclosed for context-sensitive delivery notification. In one embodiment, the method involves determining, by a computing device, an anticipated delivery time, receiving, by the computing device, from a first delivery-sensing depository, an indication that the first delivery-sensing depository has received a delivery at a time differing from the anticipated delivery time, and alerting, by the computing device, a user regarding the detected delivery.

In a related embodiment, determining further includes receiving, by the computing device, a delivery schedule and calculating, by the computing device, using the delivery schedule, the anticipated delivery time. In another embodiment, determining involve maintaining, in memory accessible to the computing device, the times of past deliveries detected by the first delivery-sensing depository and calculating, using the times of past deliveries, a probable future delivery time. In an additional embodiment, determining involves receiving, from a second delivery-sensing depository, an indication that a delivery has occurred at the second delivery-sensing depository, calculating, by the computing device, a probable route of a postal carrier making the delivery at the second delivery-sensing depository, and predicting, using the calculated probable route, a delivery at the first delivery-sensing depository. In still another embodiment, determining further includes receiving, from a user, an instruction specifying the anticipated delivery time.

A related embodiment also involves capturing, by the first delivery-sensing depository, using a sensor coupled to the first delivery-sensing depository, data concerning a postal carrier performing the detected delivery. Another embodiment involves receiving, by the computing device, at least one instruction describing a feature of a postal carrier associated with a dangerous parcel, determining, by the computing device, that the captured data matches the feature, and alerting, by the computing device, the user that the parcel may be dangerous. An additional embodiment involves capturing, by the first delivery-sensing depository, using a sensor coupled to the first delivery-sensing depository, data concerning a delivery vehicle performing the detected delivery. Another embodiment involves receiving, by the computing device, at least one instruction describing a feature of a delivery vehicle associated with a dangerous parcel, determining, by the computing device, that the captured data matches the feature, and alerting, by the computing device, the user that the parcel may be dangerous.

Another embodiment involves capturing, by the first delivery-sensing depository, data regarding a delivered parcel and alerting, by the computing device, the user responsively to the captured data. In a further embodiment involves capturing also includes capturing, using a camera coupled to the first delivery-sensing depository, an image of the parcel. In an additional embodiment, capturing further includes determining, using a scale coupled to the first delivery-sensing depository, the mass of the parcel. In still another embodiment, capturing further involves scanning, using a code scanner coupled to the first delivery-sensing depository, a code attached to the parcel. In another embodiment, alerting the user responsively to the captured data further comprises providing the captured data to the user. In another embodiment, alerting the user further includes receiving, by the computing device, at least one instruction describing a feature associated with a dangerous parcel, determining, by the computing device, that the captured data matches the feature, and alerting, by the computing device, the user that the parcel may be dangerous. In still another embodiment, alerting the user also involves receiving, by the computing device, at least one instruction describing a set of features associated with safe parcels, determining, by the computing device, that the captured data does not match any feature of the set of features, and alerting, by the computing device, the user that the parcel may be dangerous. The set of features is a set of codes, and determining further comprises scanning a code attached to the parcel and comparing the scanned code to each code in the set of codes, in an additional embodiment.

Also disclosed is a system for context-sensitive delivery notification. The system includes at least one delivery-sensing depository configured to detect a delivery, and a computing device configured to determine an anticipated delivery time, to receive, from the at least one delivery-sensing depository, an indication that the at least one delivery-sensing depository has received a delivery at a time differing from the anticipated delivery time, and to alert a user regarding the detected delivery. In one embodiment, the system further includes at least one user-interfacing device. In an additional embodiment, the delivery-sensing depository further comprises a solar power source.

Other aspects, embodiments and features of the system and method will become apparent from the following detailed description when considered in conjunction with the accompanying figures. The accompanying figures are for schematic purposes and are not intended to be drawn to scale. In the figures, each identical or substantially similar component that is illustrated in various figures is represented by a single numeral or notation. For purposes of clarity, not every component is labeled in every figure. Nor is every component of each embodiment of the system and method shown where illustration is not necessary to allow those of ordinary skill in the art to understand the system and method.

BRIEF DESCRIPTION OF THE DRAWINGS

The preceding summary, as well as the following detailed description of the disclosed system and method, will be better understood when read in conjunction with the attached drawings. For the purpose of illustrating the system and method, presently preferred embodiments are shown in the drawings. It should be understood, however, that neither the system nor the method is limited to the precise arrangements and instrumentalities shown.

DETAILED DESCRIPTION OF SPECIFIC EMBODIMENTS

Figure 1A:
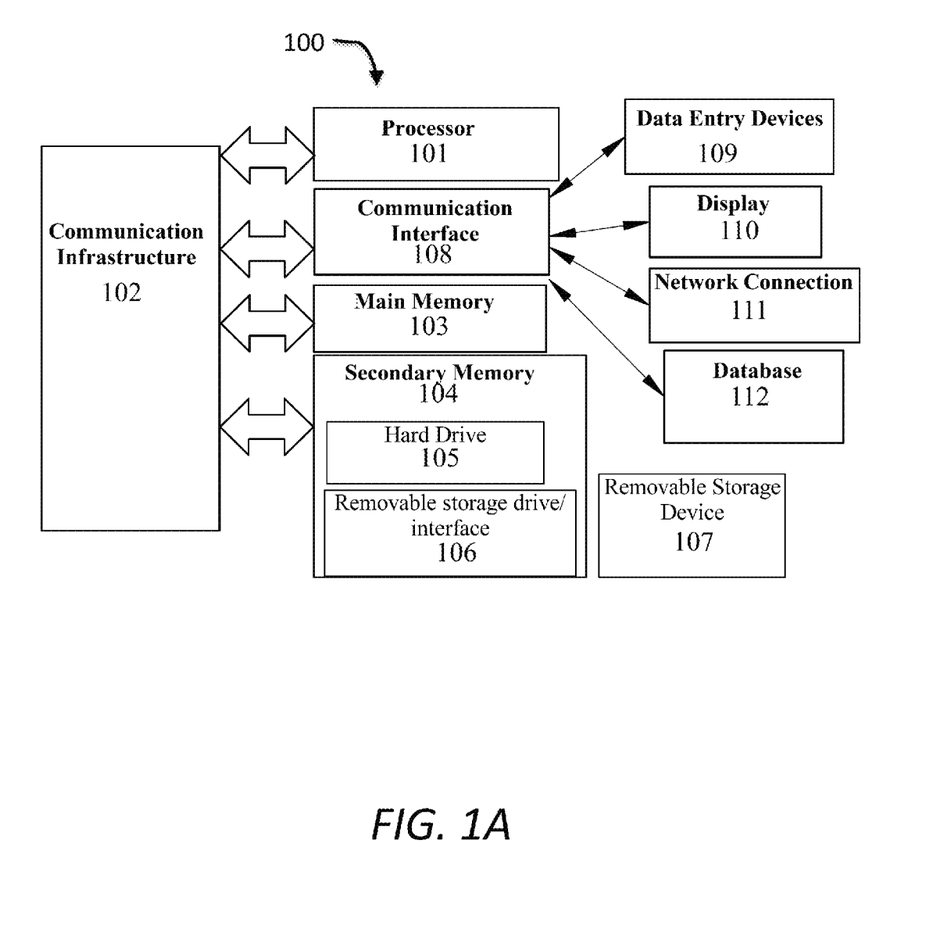
FIG. 1A is a schematic diagram depicting an example of an computing device as described herein.

Some embodiments of the disclosed system and methods will be better understood by reference to the following comments concerning computing devices. A "computing device" may be defined as including personal computers, laptops, tablets, smart phones, and any other computing device capable of supporting an application as described herein. The system and method disclosed herein will be better understood in light of the following observations concerning the computing devices that support the disclosed application, and concerning the nature of web applications in general. An exemplary computing device is illustrated by FIG. 1A. The processor 101 may be a special purpose or a general-purpose processor device. As will be appreciated by persons skilled in the relevant art, the processor device 101 may also be a single processor in a multi-core/multiprocessor system, such system operating alone, or in a cluster of computing devices operating in a cluster or server farm. The processor 101 is connected to a communication infrastructure 102, for example, a bus, message queue, network, or multi-core message-passing scheme.

The computing device also includes a main memory 103, such as random access memory (RAM), and may also include a secondary memory 104. Secondary memory 104 may include, for example, a hard disk drive 105, a removable storage drive or interface 106, connected to a removable storage unit 107, or other similar means. As will be appreciated by persons skilled in the relevant art, a removable storage unit 107 includes a computer usable storage medium having stored therein computer software and/or data. Examples of additional means creating secondary memory 104 may include a program cartridge and cartridge interface (such as that found in video game devices), a removable memory chip (such as an EPROM, or PROM) and associated socket, and other removable storage units 107 and interfaces 106 which allow software and data to be transferred from the removable storage unit 107 to the computer system. In some embodiments, to "maintain" data in the memory of a computing device means to store that data in that memory in a form convenient for retrieval as required by the algorithm at issue, and to retrieve, update, or delete the data as needed.

The computing device may also include a communications interface 108. The communications interface 108 allows software and data to be transferred between the computing device and external devices. The communications interface 108 may include a modem, a network interface (such as an Ethernet card), a communications port, a PCMCIA slot and card, or other means to couple the computing device to external devices. Software and data transferred via the communications interface 108 may be in the form of signals, which may be electronic, electromagnetic, optical, or other signals capable of being received by the communications interface 108. These signals may be provided to the communications interface 108 via wire or cable, fiber optics, a phone line, a cellular phone link, and radio frequency link or other communications channels. Other devices may be coupled to the computing device 100 via the communications interface 108. In some embodiments, a device or component is "coupled" to a computing device 100 if it is so related to that device that the product or means and the device may be operated together as one machine. In particular, a piece of electronic equipment is coupled to a computing device if it is incorporated in the computing device (e.g. a built-in camera on a smart phone), attached to the device by wires capable of propagating signals between the equipment and the device (e.g. a mouse connected to a personal computer by means of a wire plugged into one of the computer's ports), tethered to the device by wireless technology that replaces the ability of wires to propagate signals (e.g. a wireless BLUETOOTH® headset for a mobile phone), or related to the computing device by shared membership in some network consisting of wireless and wired connections between multiple machines (e.g. a printer in an office that prints documents to computers belonging to that office, no matter where they are, so long as they and the printer can connect to the internet). A computing device 100 may be coupled to a second computing device (not shown); for instance, a server may be coupled to a client device, as described below in greater detail.

The communications interface in the system embodiments discussed herein facilitates the coupling of the computing device with data entry devices 109, the device's display 110, and network connections, whether wired or wireless 111. In some embodiments, "data entry devices" 109 are any equipment coupled to a computing device that may be used to enter data into that device. This definition includes, without limitation, keyboards, computer mice, touchscreens, digital cameras, digital video cameras, wireless antennas, Global Positioning System devices, audio input and output devices, gyroscopic orientation sensors, proximity sensors, compasses, scanners, specialized reading devices such as fingerprint or retinal scanners, and any hardware device capable of sensing electromagnetic radiation, electromagnetic fields, gravitational force, electromagnetic force, temperature, vibration, or pressure. A computing device's "manual data entry devices" is the set of all data entry devices coupled to the computing device that permit the user to enter data into the computing device using manual manipulation. Manual entry devices include without limitation keyboards, keypads, touchscreens, track-pads, computer mice, buttons, and other similar components. A computing device may also possess a navigation facility. The computing device's "navigation facility" may be any facility coupled to the computing device that enables the device accurately to calculate the device's location on the surface of the Earth. Navigation facilities can include a receiver configured to communicate with the Global Positioning System or with similar satellite networks, as well as any other system that mobile phones or other devices use to ascertain their location, for example by communicating with cell towers. A code scanner coupled to a computing device is a device that can extract information from a "code" attached to an object. In one embodiment, a code contains data concerning the object to which it is attached that may be extracted automatically by a scanner; for instance, a code may be a bar code whose data may be extracted using a laser scanner. A code may include a quick-read (QR) code whose data may be extracted by a digital scanner or camera. A code may include a radio frequency identification (RFID) tag.

In some embodiments, a computing device's "display" 109 is a device coupled to the computing device, by means of which the computing device can display images. Display include without limitation monitors, screens, television devices, and projectors.

Computer programs (also called computer control logic) are stored in main memory 103 and/or secondary memory 104. Computer programs may also be received via the communications interface 108. Such computer programs, when executed, enable the processor device 101 to implement the system embodiments discussed below. Accordingly, such computer programs represent controllers of the system. Where embodiments are implemented using software, the software may be stored in a computer program product and loaded into the computing device using a removable storage drive or interface 106, a hard disk drive 105, or a communications interface 108.

The computing device may also store data in database 112 accessible to the device. A database 112 is any structured collection of data. As used herein, databases can include "NoSQL" data stores, which store data in a few key-value structures such as arrays for rapid retrieval using a known set of keys (e.g. array indices). Another possibility is a relational database, which can divide the data stored into fields representing useful categories of data. As a result, a stored data record can be quickly retrieved using any known portion of the data that has been stored in that record by searching within that known datum's category within the database 112, and can be accessed by more complex queries, using languages such as Structured Query Language, which retrieve data based on limiting values passed as parameters and relationships between the data being retrieved. More specialized queries, such as image matching queries, may also be used to search some databases. A database can be created in any digital memory.

Persons skilled in the relevant art will also be aware that while any computing device must necessarily include facilities to perform the functions of a processor 101, a communication infrastructure 102, at least a main memory 103, and usually a communications interface 108, not all devices will necessarily house these facilities separately. For instance, in some forms of computing devices as defined above, processing 101 and memory 103 could be distributed through the same hardware device, as in a neural net, and thus the communications infrastructure 102 could be a property of the configuration of that particular hardware device. Many devices do practice a physical division of tasks as set forth above, however, and practitioners skilled in the art will understand the conceptual separation of tasks as applicable even where physical components are merged.

The systems may be deployed in a number of ways, including on a stand-alone computing device, a set of computing devices working together in a network, or a web application. Persons of ordinary skill in the art will recognize a web application as a particular kind of computer program system designed to function across a network, such as the Internet. A schematic illustration of a web application platform is provided in FIG. 1A. Web application platforms typically include at least one client device 120, which is an computing device as described above. The client device 120 connects via some form of network connection to a network 121, such as the Internet. The network 121 may be any arrangement that links together computing devices 120, 122, and includes without limitation local and international wired networks including telephone, cable, and fiber-optic networks, wireless networks that exchange information using signals of electromagnetic radiation, including cellular communication and data networks, and any combination of those wired and wireless networks. Also connected to the network 121 is at least one server 122, which is also an computing device as described above, or a set of computing devices that communicate with each other and work in concert by local or network connections. Of course, practitioners of ordinary skill in the relevant art will recognize that a web application can, and typically does, run on several servers 122 and a vast and continuously changing population of client devices 120. Computer programs on both the client device 120 and the server 122 configure both devices to perform the functions required of the web application 123. Web applications 123 can be designed so that the bulk of their processing tasks are accomplished by the server 122, as configured to perform those tasks by its web application program, or alternatively by the client device 120. Some web applications 123 are designed so that the client device 120 solely displays content that is sent to it by the server 122, and the server 122 performs all of the processing, business logic, and data storage tasks. Such "thin client" web applications are sometimes referred to as "cloud" applications, because essentially all computing tasks are performed by a set of servers 122 and data centers visible to the client only as a single opaque entity, often represented on diagrams as a cloud.

Many computing devices, as defined herein, come equipped with a specialized program, known as a web browser, which enables them to act as a client device 120 at least for the purposes of receiving and displaying data output by the server 122 without any additional programming. Web browsers can also act as a platform to run so much of a web application as is being performed by the client device 120, and it is a common practice to write the portion of a web application calculated to run on the client device 120 to be operated entirely by a web browser. Such browser-executed programs are referred to herein as "client-side programs," and frequently are loaded onto the browser from the server 122 at the same time as the other content the server 122 sends to the browser. However, it is also possible to write programs that do not run on web browsers but still cause an computing device to operate as a web application client 120. Thus, as a general matter, web applications 123 require some computer program configuration of both the client device (or devices) 120 and the server 122. The computer program that comprises the web application component on either computing device's system FIG. 1A configures that device's processor 200 to perform the portion of the overall web application's functions that the programmer chooses to assign to that device. Persons of ordinary skill in the art will appreciate that the programming tasks assigned to one device may overlap with those assigned to another, in the interests of robustness, flexibility, or performance. Furthermore, although the best known example of a web application as used herein uses the kind of hypertext markup language protocol popularized by the World Wide Web, practitioners of ordinary skill in the art will be aware of other network communication protocols, such as File Transfer Protocol, that also support web applications as defined herein.

Embodiments of the disclosed methods and system alert a user to the imminent or recent delivery of a parcel in a manner that accounts for the circumstances of the user and of the delivery. If the user is near the mailbox or other depository, the depository may signal the user; if the user is at home, the system may alert the user via household appliances, a home computer, or a special-purpose console. When the user is away, the system may alert the user via mobile device while leaving the home console depository silent, thus ensuring that the right person gets the message while reducing nuisance for other people; the system may even use processes to identify the correct user. Likewise, embodiments of the method detect unusual delivery times and alert users to them, so users know to pick up unexpected parcels. Some embodiments also cross check such unusual deliveries with indicia of potentially dangerous parcels, to warn the user of potential hazards.

Figure 2:
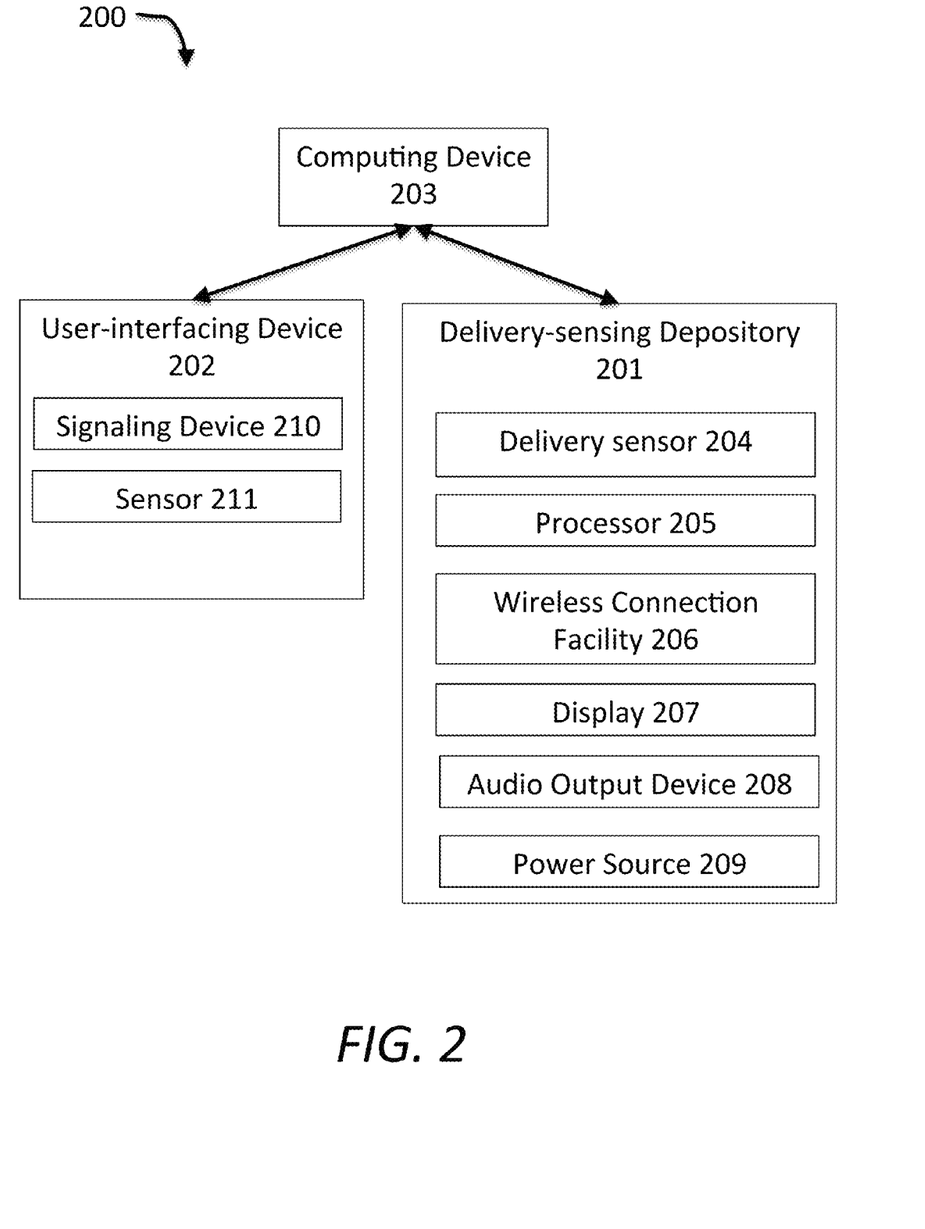
FIG. 2 is a block diagram depicting one embodiment of the disclosed system.

FIG. 2 illustrates some embodiments of the disclosed system 200. As a brief overview, the system 200 includes at least one delivery-sensing depository 201. The system 200 includes at least one user-interfacing device 202. The system 200 includes a computing device 203.

Referring now to FIG. 2 in further detail the system 200 includes at least one delivery-sensing depository 201. In some embodiments, the at least one delivery-sensing depository 201 is adapted to detect a delivery status and to communicate the detected status to the computing device 203. The at least one delivery-sensing depository 201 may include a receptacle in which to receive parcels. Parcels may include any item that may be delivered, including letters, post cards, catalogs, periodicals, and packages. The receptacle may be a bin. The receptacle may be a basket. The receptacle may be a mailbox. In some embodiments, the receptacle has at least one door; the receptacle may have a single door through which parcels are inserted for delivery and through which a user can retrieve delivered parcels. The receptacle may have two doors, one for the delivery of parcels and one for retrieval. The receptacle may include a slot through which parcels may be deposited during delivery. The slot may have a door.

The delivery-sensing depository 201 may have at least one sensor 204 that detects the delivery of a parcel. In some embodiments, the at least one sensor 204 includes an accelerometer. The accelerometer may be attached to a door that admits delivery of parcels, so that it detects any movement of that door. In some embodiments, the accelerometer measures the degree of acceleration. In some embodiments, the accelerometer measures the duration of acceleration. In some embodiments, the accelerometer measures the direction of acceleration; for instance, the accelerometer may be coupled to one or more gyroscopes. The sensor 204 in some embodiments includes a magnetometer. The magnetometer in some embodiments senses the magnitude of magnetic fields. The magnetometer in some embodiments senses the polarity of magnetic fields. In some embodiments, the magnetometer detects the direction of local field lines of magnetic fields. In some embodiments, the magnetometer is adapted to detect a change in direction with respect to the Earth's magnetic field, to indicate that a door on which the magnetometer is mounted has opened or closed. In some embodiments, the magnetometer is adapted to detect a change in direction with respect to a magnetic field generated by a magnet mounted on the receptacle (not shown). In some embodiments, the magnetometer is adapted to detect a change in strength in a magnetic field generated by a magnet mounted on the mailbox (not shown). In some embodiments, the magnetometer is adapted to detect a change in polarity with respect to a magnetic field generated by a magnet mounted on the mailbox (not shown). In some embodiments, the at least one sensor 204 includes both an accelerometer and a magnetometer. Where there are two doors in the receptacle, there may be a sensor on each door.

In some embodiments, the sensor 204 includes components that detect parcel delivery by directly detecting the delivered parcel. In some embodiments, the at least one sensor 204 includes a code scanner. In other embodiments, the at least one sensor 204 includes a camera. The camera may include a light source (not shown). The light source may be a flash. The light source may be an incandescent light bulb. The light source may be a florescent light bulb, such as a compact florescent light. The light source may be a light-emitting diode (LED). The light source may be bioluminescent. The light source may be phosphorescent. The light source may be chemiluminescent. The light source may be radioluminescent. The light source may be a device that transmits exterior light to the camera's field of vision by reflective means. In some embodiments, the camera is mounted with its field of vision within the receptacle, so that for example the camera can detect the insertion of the parcel, or film the parcel itself. In some embodiments, the camera is mounted with its field of vision outside the receptacle; for instance, the camera may be mounted so as to detect the presence of a postal carrier in the act of delivering the parcel, or to film the postal carrier. The camera may be stationary. The camera may be mounted on a mobile turret. The camera may be equipped with image compression technology. The image compression technology in some embodiments is a joint photographic experts group (JPEG) compression chip. In some embodiments, the camera includes a memory chip for storage of images. The at least one sensor 204 may include a temperature sensor. The at least one sensor 204 may include a weight sensor, such as a scale upon which a delivered parcel may rest. The at least one sensor 204 may include a linear displacement sensor. The at least one sensor 204 may include a profiling sensor such as a laser profiling sensor. The at least one sensor may include a beam-interruption sensor such as an infrared beam aimed at a receptor that will signal when the receptor ceases to sense the infrared beam. The at least one sensor 204 may include a biometric sensor such as a fingerprint reader. The at least one sensor 204 may include capacitive touch sensor. The at least one sensor 204 may include an inductive touch sensor. The at least one sensor 204 may include a passive infrared sensor.

Figure 1B:
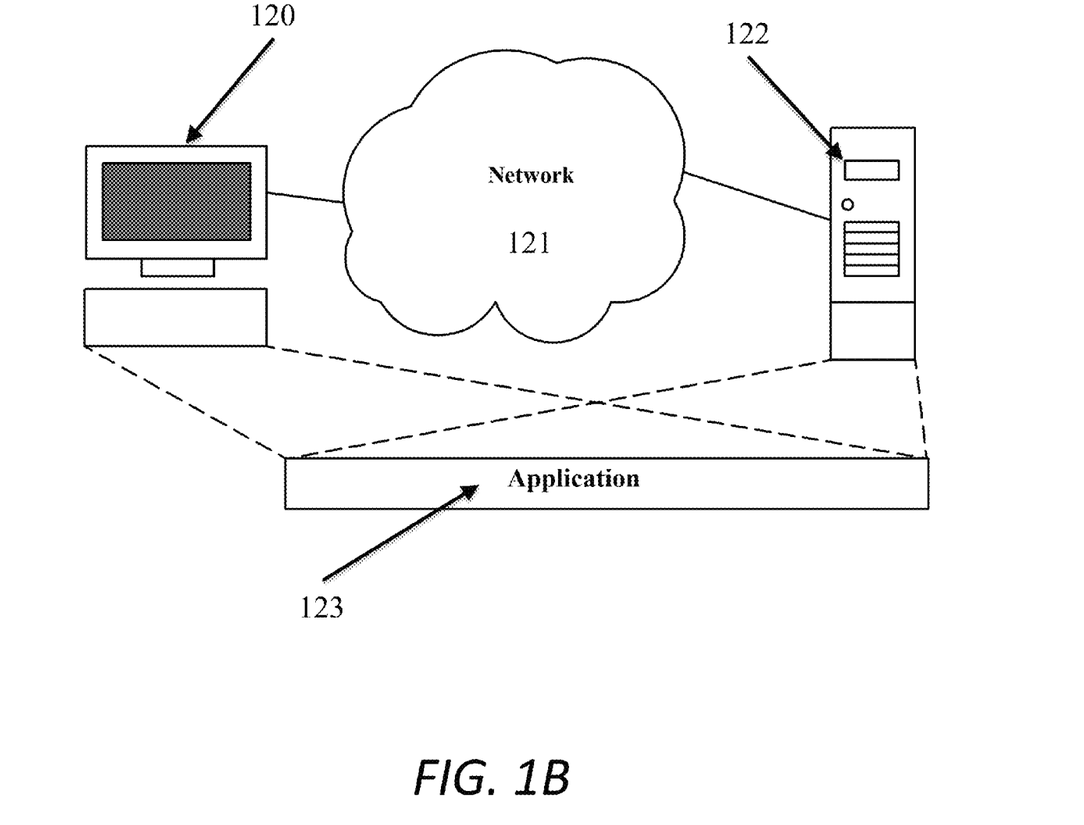
FIG. 1B is a schematic diagram of a network-based platform, as disclosed herein.

The delivery-sensing depository 201 may include a processor 205 that receives the input from the at least one sensor 204 and communicates the received input to the computing device 203. The processor 205 may be a computing device 100 as described above in reference to FIGS. 1A-1B. The processor 205 may be a microprocessor. In some embodiments, the computing device 203 is integrated in the delivery-sensing depository 201; the processor 205 may be the computing device 203. The processor 205 may communicate with the at least one sensor 204 by means of circuit board to which the processor 205 and the at least one sensor connect. The processor 205 may be mounted on the circuit board. The at least one sensor 204 may be mounted on the circuit board. The at least one sensor 204 may communicate with a wireless transceiver mounted to the circuit board.

In some embodiments, the delivery-sensing depository 201 communicates with the computing device 203. The delivery-sensing depository 201 may communicate with the computing device 203 by a wired connection. The delivery-sensing depository 201 may communicate with the computing device 203 by means of wireless communication. The delivery-sensing depository 201 may perform the wireless communication by means of a wireless connection facility 206 coupled to the delivery-sensing depository 201. The wireless connection facility 206 may be incorporated in the delivery-sensing depository 201. The wireless connection facility 206 may be housed separately from the delivery-sensing depository 201. The delivery-sensing depository 201 may connect to the wireless connection facility 206 via an electrical wire. The delivery-sensing depository 201 may connect to the wireless connection facility 206 via a wireless connection; for example, the delivery-sensing depository 201 and wireless connection 206 facility may communicate via infrared radiation. The wireless connection facility 206 may include an antenna. The wireless communication 206 facility may include a transceiver chip configured to communicate using electromagnetic radiation; for instance, the transceiver chip may be configured to communicate at 915 megahertz. The wireless connection facility 206 may include an RFID interrogator. The wireless connection facility 206 may include any device necessary to perform any form of near-field communication. The wireless connection facility 206 may communicate via "wifi." The wireless connection facility 206 may communicate using any cellular data service. The wireless connection facility 206 may communicate via any satellite communication technology. The wireless connection facility 206 may communicate via any radio communication technology, including microwave. The wireless connection facility 206 may communicate via free space optical communication. The wireless connection facility 206 may communicate via sonic communication, such as ultrasonic communication. The wireless connection facility 206 may communicate via electromagnetic induction.

The delivery-sensing depository 201 may connect to the computing device 203 directly by wireless or wired means; in other embodiments, the delivery-sensing depository 201 connects to the computing device 203 via a network 121 as described above in reference to FIGS. 1A-B. The delivery-sensing depository 201 in some embodiments is also programmed to receive a signal, such as a "ping," designed to determine whether the delivery-sensing depository 201 is currently operating and able to communicate, and to send a signal in response. In some embodiments, the delivery-sensing depository 201 is further programmed to verify that it is located in a particular place. In some embodiments, the delivery-sensing depository 201 verifies its location using a navigation facility (not shown) that is coupled to the delivery-sensing depository 201. The delivery-sensing depository 201 may communicate with the computing device 203 regularly to update its status; for instance, the delivery-sensing depository 201 may communicate with the computing device 203 every five seconds. The delivery-sensing depository 201 may communicate with the computing device 203 every five minutes. The delivery-sensing depository 201 may communicate with the computing device 203 upon sensing a change in delivery status. The delivery-sensing depository 201 may communicate with the computing device 203 when prompted to do so by a communication initiated by the computing device 203.

In some embodiments, the delivery-sensing depository 201 is adapted to communicate with persons in its immediate vicinity. In some embodiments, the delivery-sensing depository 201 includes a display 207. The display 207 may be a display as set forth above in reference to FIGS. 1A-B. The delivery-sensing depository 201 may include an audio output device 208, such as a speaker. The audio output device 208 in some embodiments is a buzzer. In some embodiments, the delivery-sensing depository 201 includes an indicator light (not shown). The indicator light may be any light source as described above in reference to FIG. 2. The delivery-sensing depository 201 may be adapted to cause the indicator light to signal various error states via blinking patterns; for example, one error state may be indicated by blinking on and off four times per second, while a second error state may be indicated by blinking on and off two times per second. The delivery-sensing depository 201 may include a light source (not shown) that illuminates the interior of the receptacle. In some embodiments, the light source is a light source as described above in reference to FIG. 2. The delivery-sensing depository 201 may be configured to cause the light source to illuminate the interior of the receptacle when the at least one sensor 204 detects that a user has opened a door to the receptacle.

The delivery-sensing depository 201 may be coupled to data entry devices (not shown). For example, the mailbox-mounted device may have a button the postal carrier can push to receive a message stored in the delivery-sensing depository 201. The delivery-sensing depository 201 may have a keyboard to receive messages from a user to be published to another person. The delivery-sensing depository 201 may have a touchscreen to receive messages from a user to be published to another person. The delivery-sensing depository 201 may have a touch-pad to receive messages from a user to be published to another person. The delivery-sensing depository 201 may have a microphone to receive messages from a user to be published to another person.

The delivery-sensing depository 201 in some embodiments includes a power source 209 that powers the other elements of the delivery-sensing depository 201, such as the at least one sensor 204, the processor 205, the wireless connection facility 206, the display 207, and the audio output device 208. In some embodiments, the power source 209 is a battery housing electrically connected to the delivery-sensing depository 201. The battery housing may be integrated with the delivery-sensing depository 201. The battery housing may be detachable from the delivery-sensing depository 201. The battery housing may be separate from the delivery-sensing depository 201; for instance, the battery housing may be connected to the delivery-sensing depository 201 by an electrical wire. The battery housing may house non-rechargeable batteries such as alkaline batteries. The battery housing may house rechargeable batteries such as nickel-cadmium, nickel-metal hydride, lithium-polymer, or lithium-ion batteries.

In some embodiments, the power source 209 is solar-powered; for instance, the power source 209 may include one or more photovoltaic panels. In some embodiments, the power source 209 is powered by connection to alternating current (AC) wiring. In some embodiments, the power source 209 is powered by a fuel cell. Some embodiments of the power source 209 involve a combination of the above elements; for instance, the power source 209 may include a solar panel connected to a rechargeable battery pack. The power source 209 may include an AC connection with a backup battery. In some embodiments, the delivery-sensing depository 201 includes a power monitor. The delivery-sensing depository 201 may be adapted to transmit its power level, as detected by a power monitor, to the computing device 203. The delivery-sensing depository 201 in some embodiments encases electrical elements in a waterproof housing. In some embodiments, the delivery-sensing depository 201 encases electrical elements in a in a water-resistant housing.

In some embodiments, the at least one sensor 204, the processor 205, the wireless connection facility 206, the display 207, the audio output device 208, and the power source 209 are contained in one or more devices that may be combined with a conventional depository, such as mailbox, to form the delivery-sensing depository 201. The devices may be attached to the exterior of the depository. The devices may be attached to the interior of the depository. The device may be attached to the door of the depository, where the depository has a door. In some embodiments, some of the devices are attached to the depository, while others are not. The devices in some embodiments are an integral part of the depository; for instance, the delivery-sensing depository 201 may be manufactured as a single unit.

The system 200 includes at least one user-interfacing device 202. The at least one user-interfacing device 202 may be integrated in the delivery-sensing depository 201; for instance, the at least one delivery-sensing depository 201 may be one of the at least one user-interfacing device 202 because it incorporates such elements as a display 207 and data-entry devices, as described above in reference to FIG. 2. The at least one user-interfacing device 202 may be a separate device from the delivery-sensing depository 201. The at least one user-interfacing device 202 may be a computing device 100 as disclosed above in reference to FIGS. 1A-B; for instance, the at least one user-interfacing device 202 may be a mobile device such as a mobile phone, tablet, laptop, or netbook. The at least one user-interfacing device 202 may be a special-purpose control system coupled to the delivery-sensing depository. As an example the at least one user-interfacing device 202 may be incorporated in a dwelling or place of business corresponding to the delivery-sensing depository 201.

The user-interfacing device 202 may include one or more signaling devices 210. In an embodiment, a signaling device 210 is a device by means of which a user-interfacing device 202 can convey an intelligible signal indicating a detected delivery status to a user, as set forth in further detail below. The at least one signaling device 210 may include any device described above for conveying information to a user in reference to FIG. 2. The at least one signaling device 210 may include a display, such as a display 110 as described above in reference to FIGS. 1A-B. The at least one signaling device 210 may include one or more lights. The one or more lights may be any light source described above in reference to FIG. 2. In some embodiments, the user interfacing device 202 uses household appliances coupled to the user-interfacing device 202 as a signaling device 210; for instance, the house lights in one embodiment may be connected to a controller capable of interfacing with a computing device 100 as described above in reference to FIGS. 1A-B, and the user-interfacing device 202 may cause the house lights to blink on and off in a certain pattern to indicated a detected delivery status, in much the same way that a theater blinks lights on and off to signal the imminent commencement of an act. Likewise, the user-interfacing device 202 may use an alarm system such as a burglar or fire alarm system to signal the user; the alarm system may be capable of emitting a signal that is unlikely to be confused for a signal indicating an emergency. In another embodiment, the at least one signaling device 210 includes a noise-emitting device, such as a speaker or a buzzer. In still another embodiment, the at least one signaling device 210 includes a vibrator, such as vibrator incorporated in a mobile phone. The user-interfacing device 202 may include other indicators, such as an RSSI strength indicator, a wi-fi strength indicator, or one or more error indicators to inform the user that a connection to the delivery-sensing depository 201 or to a network has failed.

In some embodiments, the at least one user-interfacing device 202 is near to the user. In one embodiment, the at least one user-interfacing device 202 is near to the user if it is sufficiently close to the user to enable it to signal the user by means of devices coupled to the user-interface device 202. For instance, if the at least one user-interfacing device 202 is a phone within earshot of the user, such that the user could hear the phone emit a signal such as a ringtone, the user-interface may be near the user. In some embodiments, the at least one user-interfacing device 202 has one or more sensors 211 that the at least one user-interfacing device 202 can use to determine that the user is near the at least one user-interfacing device. The one or more sensors 211 may include one or more motion sensors. The one or more sensors 211 may include one or more heat sensors. The one or more sensors 211 may include any sensor as described above in reference to the delivery-sensing depository 201 for detecting the opening of a door. The one or more sensors 211 may include one or more cameras. The sensor might be an inertial measurement unit combining accelerometers with attitude sensors, such as those present on some mobile devices; where the at least one user-interfacing device 202 is a mobile device having an inertial measurement unit, the at least one user-interfacing device 202 may determine that a pattern of motion detected by the motion sensor is consistent with the mobile device being on the person of a user. The power source 209 may be capable of accepting different kinds of batteries in the same battery pack. Thus, for example, if there is a power failure for an embodiment in which rechargeable batteries are recharged from the power grid, the user may be able to insert one or more alkaline batteries in place of the rechargeable batteries. To prevent the recharging circuit from discharging the newly inserted alkaline batteries or recharging them inappropriately, causing leaks, the processor 205 may be configured to switch on the battery charging circuit only when the voltage falls below a certain threshold, such as 2.6 volts. The processor 205 may be configured to detect that the batteries in the battery pack are alkaline batteries rather than rechargeable batteries, when the voltage falls below the threshold, by beginning the recharging process and monitoring the recharging curve: the voltage on an alkaline battery quickly regains it initial value during recharging, whereas the voltage on many rechargeable batteries recovers more slowly, so the processor 205 may be programmed to deactivate the charging circuit upon detecting a rapid initial rise in voltage. The processor 205 may be further configured to signal to a user that battery replacement is needed, using any means disclosed herein for communication with users.

The at least one user-interfacing device 202 may detect that a user is near because the user is interacting with a device. For instance, the user may interacting with the user-interfacing device 202; as an example, if the at least one user-interfacing device 202 is a computing device 100 as disclosed above in reference to FIGS. 1A-B, the user may engage one or more data entry devices 109, to "log on" to the device, to perform communication via the at least one user-interfacing device 202 with another user or device, or for any other purpose to which a user might put a computing device. In some embodiments, a home appliance may be adapted to communicate to the at least one user-interfacing device 202 that it is being used by the user; for instance, house lights that may be controlled by a remote device via a communication channel may also signal to the at least one user-interfacing device 202 via the same communication channel that a user has switched them on or off. Likewise, a utility meter, such as a water or sewage meter, that is equipped to signal its current reading may signal a modified reading to the at least one user-interfacing device 202, indicating the presence of a user that is making use of the corresponding utility; for instance, a change in water meter reading may indicate that the user has turned on a faucet or started up a dishwasher. A particular pattern of usage by a user of a device might indicate that the user is likely still "near" to the device; for instance, where the user has switched the house lights on and has not switched them off, the at least one user-interfacing device 202 may determine that the user is probably still in the room, floor, or edifice in which the user switched the lights on.

In some embodiments, the at least one user-interfacing device 202 is configured to identify the detected user. For instance, where the user is interfacing directly with the at least one user-interfacing device 202, the user may be doing so via one or more user accounts relating to that user. Where the user is checking electronic mail, for example, the at least one user-interfacing device 202 may conclude that the user is the possessor of the electronic mail account that the user is checking. In other embodiments, the at least one user-interfacing device 202 may identify the user via biometric data; for instance, where the one or more sensors 211 includes a camera, the at least one user-interfacing device 202 may use facial recognition software to identify the user. In still other embodiments, the at least one user-interfacing device 202 identifies a pattern of sensory input consistent with a user's signature pattern of behavior; for instance, the bathroom light being switched on for a certain period, concurrent with a substantially simultaneous flow of roughly equivalent volumes of water through a water meter and a sewage meter for a particular period of time may indicate that a particular user is taking his or her habitual shower. In another embodiment, the inertial measurement unit in a user's mobile phone may detect a series of motions consistent with a particular user's striding pattern; alternatively, any indication of motion detected by a phone belonging to a particular user may be associated with a high probability that that particular user is currently in possession of that particular phone.

One user-interfacing device 202 may be a special-purpose device adapted to communicate with the delivery-sensing depository 201 and provide the delivery status to the user. The special-purpose device may be integrated in a dwelling or office space associated with the delivery-sensing depository 201; for instance where the delivery-sensing depository 201 is the mailbox outside a user's house or apartment, the special-purpose device may be installed within the house or apartment. The special-purpose device may be freestanding. The special-purpose device may be a fixture; for instance, the special-purpose device may be installed within a wall or counter in a dwelling or office space. The special-purpose device may have a console by means of which the user interacts with the special-purpose device. The console may include a display. The console may include an indicator light indicating the detection of a delivery status; for instance, the indicator light may switch on or flash to indicate a recent delivery of a parcel. The indicator light may switch on or flash to indicate an imminent delivery of a parcel. In some embodiments, the indicator light stays on for a pre-determined period of time after the detected delivery status, and then switches off. In other embodiments, the indicator light switches off when the user enters an input via the console indicating that the user has seen the indicator light. The console may include intensity control for the indicator light. The console may be configured to allow the user to program different patterns of display via the indicator light; for instance, the user may be able to set the period for which the light will shine or flash to indicate a delivery status. The user may program one pattern of flashing or shining for one delivery status and another for a second delivery status (for instance, flashing on and off for an imminent delivery, shining steadily for a recently completed delivery). The console may include an audio output device such as a speaker or buzzer. The user may be able to adjust the volume of the audio output device, for instance using a volume control knob or dial on the console. The user may be able to program the special-purpose device so that the audio output device outputs a desired noise, such as a musical recording. The console may include a resent button the user can depress to reset the state of the special-purpose device to various states depending on how long the user presses the button. The console may include a microphone, permitting the user to communicate with a postal carrier via a speaker mounted on the delivery-sensing depository 101. The special-purpose device may communicate directly with the delivery-sensing depository 101, for instance using wires or a wireless connection facility similar to the wireless connection facility 206 described above in reference to FIG. 2.

The at least one user-interfacing device 202 may interact with the user in various ways. The at least one user-interfacing device 202 may receive an electronic mail message, a short messaging service (SMS) message, or a "tweet" indicating a change in delivery status, signal the reception of the message to the user, and display the message to the user via a display coupled to the at least one user-interfacing device 202. The at least one user-interfacing device 202 may also display graphs to show historical data of delivery. The at least one user-interfacing device 202 may also display a user interface by means of which the user can adjust intensity or volume levels of signaling devices such as audio output devices, displays, or indicator lights. Where the delivery-sensing depository 201 is able to sense the opening and closing of a door on the depository, the at least one user-interfacing device 202 may display an animation of the door opening or closing to the user. In some embodiments, one user-interfacing device 202 is a mobile device such as a "smartphone." The mobile device may interact with the user via a mobile application or "app." The app may communicate with the computing device 203. In other embodiments, the user-interfacing device 202 is a device mounted in a car, such as a navigation device connected to the GPS. The user-interfacing device 202 may inform the user how close the user is to the delivery-sensing depository 201. Likewise, the system 200 may modify how it conveys the delivery status to the user based on the user's detected location, as set forth more fully below. Indicator lights may have varying colors to indicate varying states.

The system 200 includes a computing device 203. In some embodiments, the computing device 203 is a computing device 100 as described above in reference to FIGS. 1A-B. In some embodiments, the computing device 203 is configured using computer programs as described above in reference to FIGS. 1A-1B. The computing device 203 may be configured using applications as described above in reference to FIGS. 1A-1B. In some embodiments, the computing device 203 is integrated in the delivery-sensing depository 201. In other embodiments, the computing device 203 is integrated in one of the at least one user-interfacing device 202. The computing device 203 may be a separate device that is not integrated in the delivery-sensing depository 201 or in the at least one user-interfacing device 202; for instance, the computing device 203 may be a server 122 as described above in reference to FIGS. 1A-B. In some embodiments, the computing device 203 communicates with the delivery-sensing depository 201 via a wired connection. In other embodiments, the computing device 203 communicates with the delivery-sensing depository 201 via a wireless connection facility 206 as described above in reference to FIG. 2. In some embodiments, the computing device 203 communicates with the at least one user-interfacing device 202 via a wired connection. In other embodiments, the computing device 203 communicates with the at least one user-interfacing device 202 via a wireless connection facility 206 as described above in reference to FIG. 2. In other embodiments, the computing device 203 communicates with the delivery-sensing depository 201 or the user-interfacing device 202 via a network, such as a network 121 as described above in reference to FIGS. 1A-B. The computing device 203 may communicate with the delivery-sensing depository 201 or the user-interfacing device 202 via a sockets connection.

In some embodiments, communication between the at least one delivery-sensing depository 201, the at least one user-interfacing device 202, and the computing device 203 is performed via a secure communications protocol. The secure communications protocol may be hypertext transfer protocol secure (HTTPS), which is created when Hypertext Transfer Protocol (HTTP) is layered on top of the secure sockets layer/transport layer security (SSL/TLS) protocol to provide authentication of the endpoint with which a device is communicating as well as bidirectional communications encryption. This protects HTTPS communications from man-in-the-middle attacks, eavesdropping and tampering. In some embodiments, the at least one delivery-sensing depository 201, computing device 203, or at least one user-interfacing device 202 allow additional devices to connect given appropriate credentials using an authorization protocol; in some embodiments, the authorization protocol is OAuth. In some embodiments, the at least one delivery-sensing depository 201, computing device 203, or at least one user-interfacing device 202 verify function calls from authorized devices using application programming interface (API) keys. In some embodiments, the at least one delivery-sensing depository 201, computing device 203, or at least one user-interfacing device 202 is activated using a device activation code that is practically impossible to spoof, to ensure authorized activation. For instance, a device's activation code may be generated using a hashing algorithm such as hash message authentication code-secure hash algorithm (HMAC-SHA1) to produce a hash that combines the device's serial number with its parent product's product secret to makes it effectively impossible for someone to extract the product secret from the activation code, or to fraudulently impersonate a device in the provisioning process.

In some embodiments, a device, which may be the at least one delivery-sensing depository 201, the computing device 203, or the user-interfacing device 202, is activated via a device provisioning process. In one embodiment, the process assigns the device a serial number, which is stored on a server (not shown); the serial number may be stored in the cloud. During activation, the device may transmit a secure activation request to the server, for instance using an activation API. The server may validate the activation request to ensure that it is cryptographically correct, and to verify that the device has not been activated previously. If the verification is successful, the server may send activating configuration information, such as a feed identifier and an API key, to the device, which may store them to allow future secure interaction with the server or with other devices. In some embodiments, an application, which may be running on another device, prompts the user for the serial number of the device they have just activated; the application uses a master key and the device serial number to request the device feed identifier and key from the server. Upon receipt of the feed identifier and key from the server, the application and device may communicate directly or via the server.

Some embodiments of the disclosed system 200 involve the manipulation of postal carrier map data. Postal carrier map data as used herein may be any information that defines the geographical location of a depository. Postal carrier map data may include mailing addresses. Postal carrier map data may include neighborhoods. Postal carrier map data may include boroughs. Postal carrier map data may include municipalities. Postal carrier map data may include provinces. Postal carrier map data may include states. Postal carrier map data may include nations. Postal carrier map data may include zip codes. Postal carrier map data may include carrier route boundaries for parcel delivery services, such as the postal service or FedEx®. Postal carrier map data may include carrier routes for parcel delivery services.

A "postal carrier," as used herein, is the person, team of persons, or machine that physically delivers packages, including letters. Postal carriers may be mail carriers. Postal carriers may be employees of private delivery companies such as UPS®, DHL®, and FedEx®.

Figure 3:
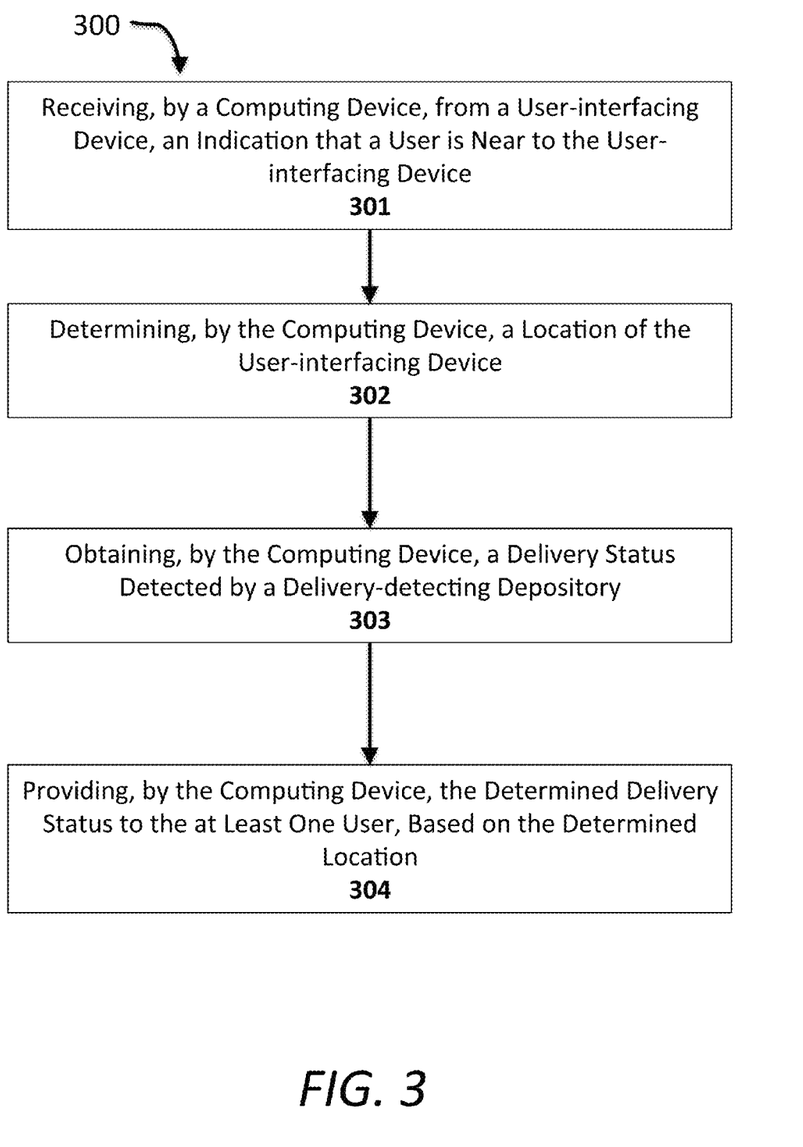
FIG. 3 is a flow chart illustrating one embodiment of the claimed method.

FIG. 3 illustrates some embodiments of a method 300 for context-sensitive delivery notification. The method 300 includes receiving, by a computing device, from a user-interfacing device, an indication that a user is near to the user-interfacing device (301). The method 300 includes determining, by the computing device, a location of the user-interfacing device (302). The method 300 includes obtaining, by the computing device, a delivery status detected by a delivery-sensing depository (303). The method 300 includes providing, by the computing device, the determined delivery status to the at least one user, based on the determined location (304).

Referring to FIG. 3 in greater detail, and by reference to FIG. 2, the computing device receives, from the user-interfacing device, an indication that a user is near to the user-interfacing device (301). The user-interfacing device 202 is the delivery-sensing depository 201 in some embodiments. In other embodiments, the user-interfacing device 202 is a separate device from the delivery-sensing depository 201. The user-interfacing device 202 may be an additional delivery-sensing depository 202. The user-interfacing device 202 may be a user-interfacing device 202 that is not a delivery-sensing depository. In some embodiments, the computing device 203 receives from the user-interfacing device 202 an indication that the user has entered an instruction on the user-interfacing device. In some embodiments, the user enters the instruction via manual data entry devices coupled to the user-interfacing device 202; for instance, the user may enter text on the user-interfacing device 202, which may send the indication to the computing device 203 as a result. Likewise, the user may select a link or file on the user-interfacing device 202. The user may place a phone call using the user-interfacing device 202, if the user-interfacing device 202 is a device, such as a phone, that can place phone calls. Where the user-interfacing device 202 is a special-purpose device, it may have a control the user can select to check for delivered parcels or to indicate that the user is present. In other embodiments, the user enters the instruction via an audio data entry device, such as a microphone, coupled to the user-interfacing device 202.

In other embodiments, the computing device 203 receives an indication that the user has interacted with an appliance coupled to the user-interfacing device 202. As an example, where the house lights in the user's dwelling are configured to communicate with the user-interfacing device 202 or with the computing device 203, they may send a signal to the user-interfacing device 202 or to the computing device 203 indicating that the user is present. In additional embodiments, the computing device 203 receives, from the user-interfacing device 202, an indication that the user-interfacing device 202 has received a signal, from a sensor coupled to the user-interfacing device 202, indicating that the user is near to the user-interfacing device 202. For instance, a motion sensor coupled to the user-interfacing device 202 may detect movement consistent with the presence of a person near to the user-interfacing device 202. An inertial measurement unit coupled to the user-interfacing device 202 may detect that the user-interfacing device 202 is being moved; for instance, a series of repeated substantially pendular motions may indicate that a mobile phone or tablet having an inertial measurement unit is in the pocket of a user who is walking. As another example, a camera coupled to the user-interfacing device 202 may capture the image of the user.

In some embodiments, receiving further involves identifying the user. The computing device 203 may identify the user by determining that the user-interfacing device 202 is a device typically used by the user; for instance, the user-interfacing device 202 may be a mobile device belonging to the user, making it highly likely that a user entering instructions on the device or carrying it is the user to whom it belongs. Likewise, a user-interfacing device 202 that is substantially permanently located within a dwelling of a particular user, and that detects a person near to it, may be assumed to be near that user, particularly if the user in question lives alone; similar assumptions apply where the user switches on the lights in an apartment solely occupied by that user. In other embodiments, the computing device 203 determines that the user-interfacing device 202 has received credentials identifying the user. For instance, the user-interfacing device 202 may have a user account associated with the user; when a person enters a username and password associated with that account, the computing device 203 may determine that the person is the user associated with the account.

In other embodiments, the computing device 203 receives, from a sensor coupled to the user-interfacing device 202, a pattern identifying the user. The pattern may be biometric data identifying the user, such as facial features that the computing device 203 recognizes using facial recognition software. The biometric data may include a retina scan performed by a retinal scanner, or a finger or thumbprint entered by the user on a fingerprint or thumbprint reader. The pattern may be a behavioral pattern; for instance, the inertial measurement unit of a mobile device in the user's pocket may record a series of motions consistent with that user's unique striding pattern. Habitual uses of appliances by the user may also help to identify the user.

The method 300 includes determining, by the computing device, a location of the user-interfacing device (302). In some embodiments, the computing device 203 maintains, in memory accessible to the computing device 203, a location of the user-interfacing device 202. For instance, if the user-interfacing device 202 is a fixture in a dwelling or a delivery-sensing depository, the user-interfacing device 202 will likely remain at the same location more or less permanently, and thus its location may be reliably stored in memory as a more or less static datum. Likewise, if the user-interfacing 202 device is an office or home personal computer, it is likely to remain fixed in one location for a substantial period of time, so that the computing device 203 must only receive an occasional update to be aware of the location of the user-interfacing device 202. The user may enter the location of one or more user-interfacing devices 202 having relatively static locations on the computing device 203.

In other embodiments, the computing device 203 maintains, in memory accessible to the computing device 203, the location of a wireless connection facility 206, and detects that the user-interfacing device 202 is in direct communication with the wireless connection facility. For instance, the computing device 203 may have a datum indicating the location of a particular wireless router, and as a result where the user-interfacing device 202 is communicating directly with that wireless router, the computing device 203 may determine that the user-interfacing device 202 is within a certain distance from the wireless router. Likewise, where one or more devices have near-field communication capabilities, the user-interfacing device 202 may be able to detect that it is able to establish near-field communication with the one or more devices; for instance, where the user-interfacing component 202 is in the user's pocket, and the user passes near the delivery-sensing depository 201 on foot or in a car, the delivery-sensing depository 201 and user-interfacing device 202 may come within near-field communicative range of one another, demonstrating that the user-interfacing device 202 is near to the delivery-sensing depository 201.

In another embodiment, the computing device 203 detects the location of the user-interfacing device 202 by receiving, from the user-interfacing device 202, data detected by a navigation facility coupled to the user-interfacing device. For example, where the user-interfacing device 202 is a smartphone or tablet with a navigation facility, the user-interfacing device 202 may determine its location using the navigation facility and convey its determined location to the computing device 203. The user-interfacing device 202 may periodically send an updated location to the computing device 202.

The computing device obtains a delivery status detected by the delivery-sensing depository (303). In some embodiments, the computing device 203 obtains, from the delivery-sensing depository, an indication that the delivery-sensing depository has detected the delivery of a parcel. In some embodiments, the delivery-sensing depository 201 detects the delivery by detecting the movement of a door of the delivery-sensing depository 201, using devices described above in reference to FIG. 2. In some embodiments, the delivery-sensing depository 201 detects the delivered mail itself using devices described above in reference to FIG. 2. In some embodiments, the delivery-sensing depository 201 detects delivery by detecting the postal carrier using devices described above in reference to FIG. 2.

In some embodiments, the delivery-sensing depository 201, having detected the delivery of mail, transmits data indicating detection to the computing device 203. In some embodiments, the transmitted data is a true or false variable indicating delivery. In some embodiments, the transmitted data includes the time of delivery. In some embodiments, the transmitted data includes the identity of the delivery-sensing depository 201. In some embodiments, the transmitted data includes the location of the delivery-sensing depository 201. Subsequently, in some embodiments, the computing device 203 matches the delivery-sensing depository 201 to a list of delivery-sensing depositories 201 maintained in memory accessible to the computing device 203. The computing device 203 may locate the address of the delivery-sensing depository 201 in memory accessible to the computing device 203, given sufficient information to identify the delivery-sensing depository 201. The computing device 203 may locate the identity of the delivery-sensing depository 201 using other information, such as the address of the delivery-sensing depository 201. In some embodiments, the computing device 203 receives delivery notification from a plurality of delivery-sensing depositories 201. The computing device 203 may determine the time of delivery for each of the plurality of delivery-sensing depositories 201. In some embodiments, the computing device 203 may determine the place of delivery for each of the plurality of delivery-sensing depositories 201; for instance, the computing device 203 may determine the address of each of the delivery-sensing depositories 201.

In some embodiments, the computing device 203 calculates a probable route of a postal carrier making the detected delivery and predicts, using the calculated probable route, a delivery of another parcel at an additional depository. In some embodiments, the computing device 203 uses delivery notification data from the delivery-sensing depository 201, combined with postal carrier map data, to calculate a probable route of the postal carrier. In some embodiments, the postal carrier map data is the location of a delivery-sensing depository 201. In some embodiments, the postal carrier map data includes the locations of a plurality of delivery-sensing depository 201. In some embodiments, the postal carrier map data is a zip code. In some embodiments, the postal carrier map data is a carrier zone. In some embodiments, the postal carrier map data is a carrier route. In some embodiments, the postal carrier map data is a street map. In some embodiments, the postal carrier route data is the boundaries of a neighborhood.

The computing device 203 in some embodiments uses the delivery notification data and the postal carrier map data to calculate the postal carrier's probable route. In some embodiments, the postal carrier map data is a map of the neighborhood, and calculating the route involves locating at least one delivery time and place on the map; where there are multiple delivery times and places, the calculation may involve connecting them into a path in the order in which the deliveries occurred. The computing device 203 may then continue the path down available routes on the map. Where the postal carrier map data includes a carrier zone, the computing device 203 may restrict the calculated path to the carrier zone. Where the postal carrier map includes a carrier route, the computing device 203 may calculate the probable route by noting when each notified delivery occurred along the route, and estimating the time of future deliveries on that route. In some embodiments, the computing device 203 maintains in memory accessible to the first computing device each of the delivery notifications. In some embodiments, the computing device 203 uses past notifications to estimate the route associated with a current delivery notification. In some embodiments, the computing device 203 matches a sequence of deliveries to a past delivery route to select a past route according to which to estimate the current route. In some embodiments, the computing device retrieves one or more tracking numbers for a delivery company; the tracking numbers may each be associated with an address. The computing device 203 may match the delivery addresses to the tracking numbers to determine the location of a delivery truck. The delivery-sensing depository 203 may record a tracking number using the at least one sensor 211. In some embodiments, the computing device 203 sends this route information to an additional computing device using communication techniques disclosed above in reference to FIG. 3.

The computing device provides the determined delivery status to the at least one user, based on the determined location (304). In one embodiment, the computing device 203 determines, based on the determined location, that the user is near to the delivery-sensing depository 201, and signals the delivery status using the delivery-sensing depository 201. In some embodiments, determining that the user is near to the delivery-sensing depository 201 involves calculating, based on the determined location, that the user is likely to pass near the delivery-sensing depository at a predicted time. For instance, if the user is driving in a car with a GPS device, the computing device 203 may determine that the GPS device is moving along a path toward the delivery-sensing depository 201 and will likely arrive in a certain amount of time; the GPS device may share with the computing device 203 the route it has plotted for the user to follow, and the time at which the GPS device estimates that the user will pass the delivery-sensing depository 201. As another example, the computing device 203 may detect that the user-interfacing device 202 is within near-field communication with a wireless connection facility 206 in a location close to the delivery-sensing depository 201. The delivery-sensing depository 201 may detect that the user-interfacing device 202 is within near-field communication with a wireless connection facility 206 in a location close to the delivery-sensing depository 201. In another example, a sensor on the delivery-sensing depository 201 directly senses the user. The delivery-sensing depository 201 may signal the delivery status to the user by means of any signaling device described above in reference to FIG. 2.

In other embodiments, the computing device 203 provides the determined delivery status using the user-interfacing device 202. For instance, the user-interfacing device 202 may display a message describing the delivery status on a display. The user-interfacing device 202 may output an audio signal using audio output devices; for instance, the user-interfacing device 202 may emit a musical noise. The user-interfacing device 202 may emit a noise typically emitted by a "buzzer." The user-interfacing device 202 may emit a chime. The user-interfacing device 202 may emit a "ring-tone." In some embodiments, the user-interfacing device 202 activates a light, such as an indicator light; the light may flash in different patterns to indicate different delivery statuses, such as a solid light to indicate a recent delivery or a flashing light to indicate an imminent delivery. The light may light up with different colors to indicate different delivery statuses, such as a red light to indicate an imminent delivery and a blue light to indicate a recent delivery.

In additional embodiments, the computing device 203 provides the delivery status to the user by signaling the delivery status using an appliance coupled to the user-interfacing device 202. For example, the computing device 203 may direct the user-interfacing device 202 to cause the house lights to flash on and off as a signal that delivery is imminent or has recently occurred; such a visual signal may be beneficial if the user has a hearing impairment. As another example, where a house or office alarm system is capable of producing a signal readily distinguishable from an emergency signal, that signal may be used to convey the delivery status to a user.

The computing device 203 may detect that the user has recovered a parcel. In one embodiment, the computing device 203 receives, from the delivery-sensing depository 201, an indication that the delivery-sensing depository 201 has detected the recovery of the parcel. The delivery-sensing depository 201 may detect the recovery of the parcel by detecting that a person has opened a door to the delivery-sensing depository 201; for instance, where the delivery-sensing depository 201 has a door that is dedicated to the recovery of delivered parcels, as described above in reference to FIG. 2, if the door has been opened and closed the computing device 203 may determine that the parcel has been recovered. In other embodiments, the delivery-sensing depository 201 senses that the parcel has been removed using a sensor that directly senses the parcel, as described above in reference to FIG. 2. The delivery-sensing depository 201 may also sense the user by means of a sensor as described above in reference to FIG. 2. In other embodiments, the computing device 203 detects the recovery of the parcel by receiving, from the user, an instruction indicating that the user has recovered the parcel; for example, the user may press a "reset button" on the delivery-sensing depository 201 or the user-interfacing device 202. The user may enter an instruction via manual data entry devices coupled to the delivery-sensing depository 201 or the user-interfacing device 202. The user may indicate the recovery of the parcel via near-field communication; for instance, the user may tap or wave a mobile device near the user-interfacing device 202 or delivery-sensing depository 201 to enter the instruction. The instruction may enter automatically when one user-interfacing device 202 passes close to the delivery-sensing depository 201 or another user-interfacing device 202. In some embodiments, the computing device 203 identifies the user retrieving the parcel, using the techniques described above for identifying the user in reference to FIG. 3.

Some embodiments of the method 300 further include receiving, by the at least one computing device, a message from the user, transmitting, by the at least one computing device 203, the message to the at least one delivery-sensing depository 201, and publishing, by the at least one mailbox-mounted device, the message. In some embodiments, the user enters the message via manual data entry devices; for instance, the user may type the message. The user may enter an audio message via audio data entry devices. The user may enter a video message via optical data entry devices. In some embodiments, the delivery-sensing 201 publishes the message as described above for publishing in reference to FIG. 3. Publishing in some embodiments occurs only upon detection of the delivery of a parcel. For instance, the user of the delivery-sensing depository 201 may leave instructions for the placement of packages, which will display upon the postal carrier opening the mailbox door. Detection of delivery may be performed by any processes described above. In some embodiments, publishing occurs only upon receiving an instruction from a postal carrier. The instruction may be entered by data entry means coupled to the delivery-sensing depository 201. The instruction may be entered by pressing a button, such as a "play" button, attached to the mailbox-mounted device. The instruction may be entered via a touchscreen. The instruction may be entered via a touchpad. The instruction may be entered via a keyboard.

Some embodiments of the method 300 include receiving, by the first computing device 203, data input by a user of the first computing device rating the quality of service provided by a postal carrier. In some embodiments, the computing device 203 presents the user with a set of topics with regard to which the user may rate the postal carrier's service. In some embodiments, the computing device 203 presents the user with a set of topics with regard to which the user may comment on the postal carrier's service. Topics may include the state of the parcel when delivered. Topics may include the punctuality of delivery. Topics may include compliance with the postal carrier's employer's policies. Topics may include compliance with requests made by the user concerning the manner of delivery.

Figure 4:
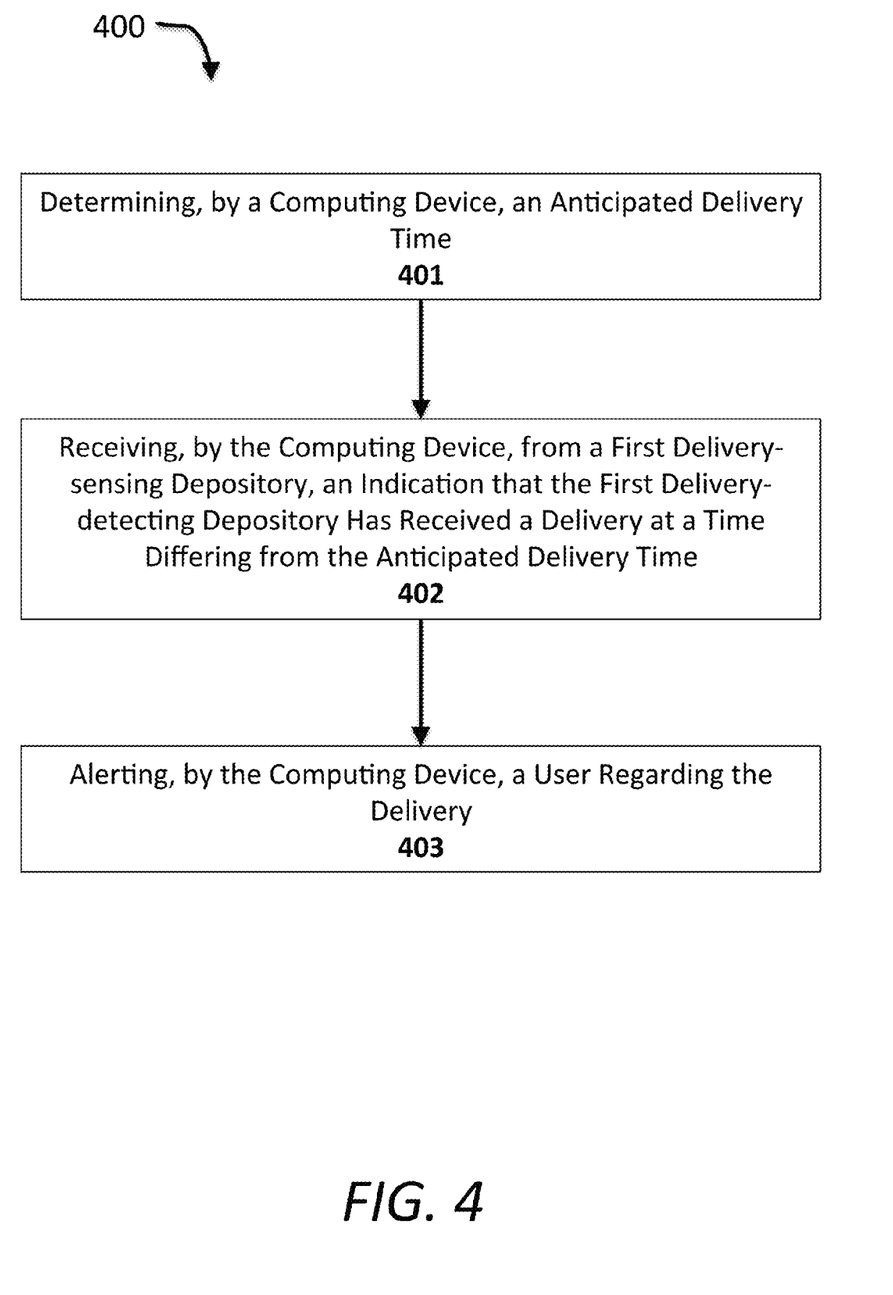
FIG. 4 is a flow chart illustrating one embodiment of the claimed method.

FIG. 4 illustrates some embodiments of a method 400 for context-sensitive delivery notification. The method 400 includes determining, by a computing device, an anticipated delivery time (401). The method 400 includes receiving, by the computing device, from a first delivery-sensing depository, an indication that the first delivery-sensing depository has received a delivery at a time differing from the anticipated delivery time (402). The method 400 includes alerting, by the computing device, a user regarding the detected delivery (403).

Referring to FIG. 4 in greater detail, and by reference to FIG. 2, the computing device 203 determines an anticipated delivery time (401). In some embodiments, the computing device 203 determines the anticipated delivery time by receiving a delivery schedule and calculating, using the delivery schedule, the anticipated delivery time. The delivery schedule may be an expected delivery time; for instance, the user may have reason to believe that a parcel will be delivered at 4 o'clock in the afternoon of Friday of the current week. The delivery schedule may be a range of possible delivery times; for example, the user may have been informed that a parcel will be delivered between 1 and 5 o'clock on Friday afternoon. In other embodiments, the delivery schedule may be an anticipated route as described above in reference to FIGS. 2-3. The delivery schedule may include postal carrier map data as described above in reference to FIG. 2. The computing device 203 may receive the delivery schedule from the user. The computing device 203 may receive, from a user, an instruction specifying the anticipated delivery time. The computing device 203 may receive the delivery schedule from a postal carrier. The computing device 203 may receive the delivery schedule from another entity, such as the company employing the postal carrier.

In another embodiment, the computing device 203 determines the anticipated delivery time by maintaining, in memory accessible to the computing device 203, the times of past deliveries detected by the first delivery-sensing depository 201 and calculating, using the times of past deliveries, a probable future delivery time. As an example, the mail may arrive every day at the user's dwelling at approximately the same time; the computing device 203 may determine the anticipated future delivery of the mail as occurring at that approximate time. In some embodiments, the computing device 203 uses the times of past deliveries in combination with the delivery schedule to determine the anticipated delivery time; for example, past deliveries may indicate that when a particular delivery company predicts delivery between 1 and 5 o'clock on a Friday, the actual delivery time is typically about 2:20.

In other embodiments, the computing device 203 determines the anticipated delivery time by receiving, from a second delivery-sensing depository, an indication that a delivery has occurred at the second delivery-sensing depository, calculating a probable route of a postal carrier making the delivery at the second delivery-sensing depository, and predicting, using the calculated probable route, a delivery at the first delivery-sensing depository. In some embodiments, the computing device 203 implements this as described above in reference to FIG. 3.

The method 400 includes receiving, by the computing device, from a first delivery-sensing depository, an indication that the first delivery-sensing depository has received a delivery at a time differing from the anticipated delivery time (402). In some embodiments, this is implemented as described above in reference to FIG. 3. Where the anticipated delivery time is a specific time, the delivery may be at a differing time if it does not occur at that specific time; alternatively, the delivery may be at a differing time if it occurs at a time that differs from the anticipated delivery time by more than a certain threshold amount. The threshold amount may be determined by a confidence measure applicable to the calculation of the anticipated delivery time. Where the anticipated delivery time is a range of times, the delivery time may differ from the anticipated delivery time if it falls outside the range; there may be a threshold amount by which the delivery time must fall outside the range before the delivery time differs from the anticipated delivery time.

The method 400 includes alerting, by the computing device, a user regarding the detected delivery (403). In some embodiments, the computing device 203 alerts the user according to any process described above for providing a delivery status to a user in reference to FIG. 3.

In some embodiments, the first delivery-sensing depository 201 captures data concerning a postal carrier performing the detected delivery using a sensor coupled to the first delivery-sensing depository 201. The data may be any data that can be captured by any sensor 204 as described above in reference to FIG. 2. In one embodiment, the data is fingerprint data. In another embodiment, the data is voice data. In still another embodiment, the data is extracted from a code on the person of the postal carrier; for instance, the postal carrier may have an RFID tag on his or her person identifying the postal carrier or the company the postal carrier works for. In some embodiments of the method, the first delivery-sensing depository 201 captures an image of a postal carrier performing the detected delivery, using a camera coupled to the first delivery-sensing depository. The image may include the face of the postal carrier. The image may include the uniform of the postal carrier. The image may include an insignia identifying the postal carrier; for instance, the postal carrier may have a badge or nametag that is captured by the camera. Some embodiments further include receiving, by the computing device 203, at least one instruction describing a feature of a postal carrier associated with a dangerous parcel, determining, by the computing device 201, that the captured data matches the feature, and alerting, by the computing device, the user that the parcel may be dangerous. The feature may be biometric. The feature may be a feature of the clothing of the postal carrier. For instance, the feature may be an insignia. The feature may be a lack of an insignia. The feature may be a lack of a uniform. The feature may be a stolen uniform. The feature may be a stolen insignia. The feature may be a fraudulent insignia. The feature may be a stolen or fraudulent code.

In some embodiments, the first delivery-sensing depository 201 captures data concerning a delivery vehicle performing the detected delivery, using a sensor 204 coupled to the first delivery-sensing depository 201. In some embodiments, the captured data is an image. In other embodiments, the captured data is a code, such as an RFID tag attached to the vehicle. In other embodiments, the captured data is a signal, such as a wireless signal emitted by a communication device on board the vehicle. Additional embodiments involve receiving, by the computing device 203, at least one instruction describing a feature of a delivery vehicle associated with a dangerous parcel, determining, by the computing device 203, that the captured data matches the feature, and alerting, by the computing device, the user that the parcel may be dangerous. The feature may be a make and model. The feature may be a license plate number. The feature may be an insignia on the vehicle. In some embodiments, the feature is that the vehicle is not a commercial vehicle, or that the vehicle does not bear the trademark, trade dress, or other distinctive features of a particular delivery company.

In other embodiments, the first delivery-sensing depository 201 captures data regarding a delivered parcel and the computing device 203 alerts the user responsively to the captured data. In one embodiment, the first delivery-sensing depository 201 captures the data by capturing, using a camera coupled to the first delivery-sensing depository 201, an image of the parcel. In another embodiment, the first delivery-sensing depository 201 captures the data by determining, using a scale coupled to the first delivery-sensing depository, the mass of the parcel. In an additional embodiment, the first delivery-sensing depository 201 captures the data by scanning, using a code scanner coupled to the first delivery-sensing depository, a code attached to the parcel.

In some embodiments, the computing device 203 alerts the user responsively to the captured data by providing the captured data to the user. In other embodiments, the computing device 203 alerts the user responsively to the captured data by receiving at least one instruction describing a feature associated with a dangerous parcel, determining that the captured data matches the feature, and alerting, by the computing device, the user that the parcel may be dangerous. For instance, an instruction may specify that a package having a certain appearance or weight is likely to be dangerous. An instruction may specify that a package having a certain color is likely to be dangerous. An instruction may specify that a package having a certain code is likely to be dangerous. Other instructions may specify that a package lacking a code is likely to be dangerous.

In some embodiments, alerting the user involves receiving, by the computing device 203, at least one instruction describing a set of features associated with safe parcels, determining, by the computing device, that the captured data does not match any feature of the set of features, and alerting, by the computing device, the user that the parcel may be dangerous. In one embodiment, the set of features is a set of codes, and the delivery-sensing device 201 scans a code attached to the parcel and compares the scanned code to each code in the set of codes. The instruction may include the set of codes; in another embodiment, the instruction provides the computing device 203 with information, such as uniform resource locator (URL), enabling the computing device 203 to query a resource, such as a database, regarding data extracted from a code associated with the package. Determining may thus involve querying the resource. The computing device 203 may follow any combination of the above instructions concerning packages, postal carriers, and vehicles to determine whether the package is likely to be dangerous.

In the above embodiments, a dangerous package is a package containing an explosive or otherwise injurious device. A dangerous package may contain a harmful chemical agent. A dangerous package may contain a harmful biological agent. A dangerous package may contain items that can cause legal or reputational harm, such as contraband. The instruction may come from the user. The instruction may come from a delivery company. The instruction may come from a government agency. The instruction may come from a law-enforcement agency. The instruction may come from a non-governmental organization, such as a private security firm, a non-profit watchdog group, or a neighborhood watch. The instruction may come from another individual person.

It will be understood that the system and method may be embodied in other specific forms without departing from the spirit or central characteristics thereof. The present examples and embodiments, therefore, are to be considered in all respects as illustrative and not restrictive, and the system method is not to be limited to the details given herein.

What is claimed is:

1. A method for context-sensitive delivery notification, the method comprising:
   detecting, by a first delivery-sensing depository incorporating a first mailbox and at least one first sensor adapted to detect the delivery of parcels, a delivery of a first parcel in the mailbox, using the at least one first sensor;
   transmitting, by the first delivery-sensing depository, information indicating the detection to a computing device;
   receiving, by the computing device, from at least one second delivery-sensing depository incorporating a second mailbox and at least one second sensor adapted to detect the delivery of parcels, an indication that the at least one second delivery-sensing depository has detected at least one second delivery of a second parcel using the at least one second sensor;
   calculating, by the computing device, a probable route of a postal carrier making the at least one second delivery at the at least one second delivery-sensing depository, the probable route including the location of the first delivery-sensing depository and the location of the at least one second delivery-sensing depository;
   predicting, by the computer device, using the calculated probable route, a delivery time at the first delivery-sensing depository;
   determining, by the computing device, that the detected delivery occurred at a time differing from the predicted delivery time; and alerting, by the computing device, a user regarding the detected delivery.

2. A method according to claim 1, further comprising capturing, by the first delivery-sensing depository, using the at least one first sensor, data concerning a postal carrier performing the detected delivery.

3. A method according to claim 2, further comprising:
receiving, by the computing device, at least one instruction describing a feature of a postal carrier associated with a dangerous parcel;
determining, by the computing device, that the captured data matches the feature; and
alerting, by the computing device, the user that the parcel may be dangerous.

4. A method according to claim 1, further comprising capturing, by the first delivery-sensing depository, using the at least one first sensor, data concerning a delivery vehicle performing the detected delivery.

5. A method according to claim 4, further comprising:
receiving, by the computing device, at least one instruction describing a feature of a delivery vehicle associated with a dangerous parcel;
determining, by the computing device, that the captured data matches the feature; and
alerting, by the computing device, the user that the parcel may be dangerous.

6. A method according to claim 1 further comprising:
capturing, by the first delivery-sensing depository, data regarding a delivered parcel; and
alerting, by the computing device, the user responsively to the captured data.

7. A method according to claim 6, wherein capturing further comprises capturing, using a camera coupled to the first delivery-sensing depository, an image of the parcel.

8. A method according to claim 6, wherein capturing further comprises determining, using a scale coupled to the first delivery-sensing depository, the mass of the parcel.

9. A method according to claim 6, wherein capturing further comprises scanning, using a code scanner coupled to the first delivery-sensing depository, a code attached to the parcel.

10. A method according to claim 6, wherein alerting the user responsively to the captured data further comprises providing the captured data to the user.

11. A method according to claim 6, wherein alerting the user further comprises:
receiving, by the computing device, at least one instruction describing a feature associated with a dangerous parcel;
determining, by the computing device, that the captured data matches the feature; and
alerting, by the computing device, the user that the parcel may be dangerous.

12. A method according to claim 6, wherein alerting the user further comprises:
receiving, by the computing device, at least one instruction describing a set of features associated with safe parcels;
determining, by the computing device, that the captured data does not match any feature of the set of features; and
alerting, by the computing device, the user that the parcel may be dangerous.

13. A method according to claim 12, wherein the set of features is a set of codes, and determining further comprises scanning a code attached to the parcel and comparing the scanned code to each code in the set of codes.

14. A system for context-sensitive delivery notification, the system comprising:
at least one delivery-sensing depository incorporating a mailbox and at least one first sensor adapted to detect the delivery of parcels, the at least one delivery-sensing depository configured to transmit information indicating the detection; and
a computing device configured to receive the transmitted information, to receive, from at least one second delivery-sensing depository incorporating a second mailbox and at least one second sensor adapted to detect the delivery of parcels, an indication that the at least one second delivery-sensing depository has detected at least one second delivery of a second parcel using the at least one second sensor, to calculate a probable route of a postal carrier making the at least one second delivery at the at least one second delivery-sensing depository, the probable route including the location of the first delivery-sensing depository and the location of the at least one second delivery-sensing depository to predict by the computer device, using the calculated probable route, a delivery time at the first delivery-sensing depository, to determine that the detected delivery occurred at a time differing from the predicted delivery time, and to alert a user regarding the detected delivery.

15. A system according to claim 14, further comprising at least one user-interfacing device.

16. A system according to claim 14, wherein the delivery-sensing depository further comprises a solar power source.

* * * * *